March 1, 1949.                    B. AMES                    2,463,011
                      CONTROL UNIT FOR ELECTRIC COOKERS
Filed Feb. 1, 1947                                    3 Sheets-Sheet 1
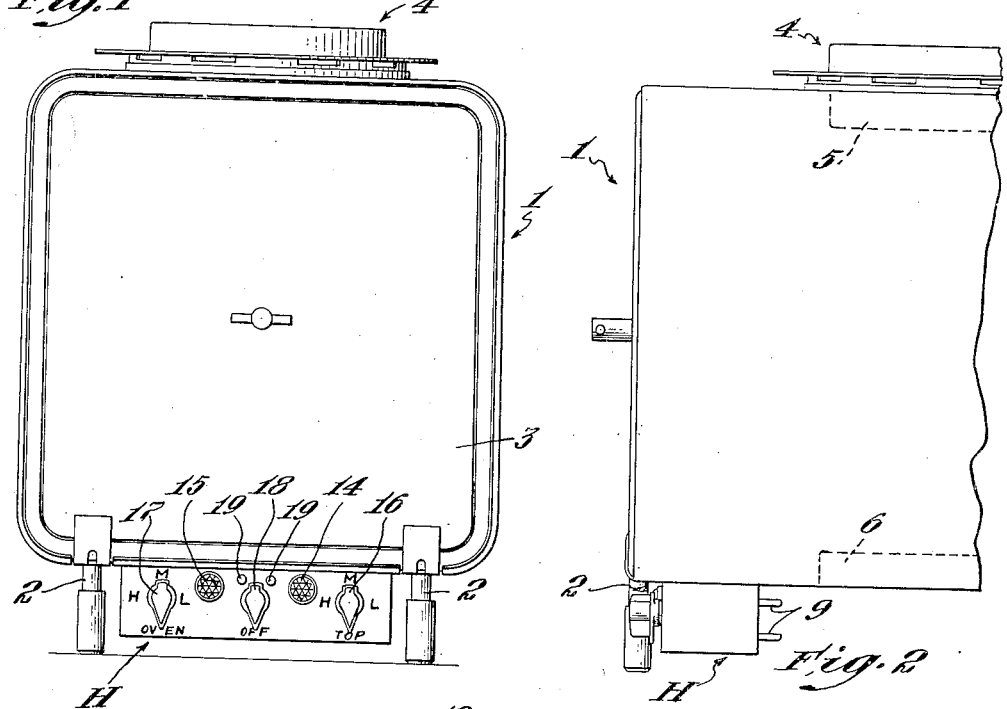
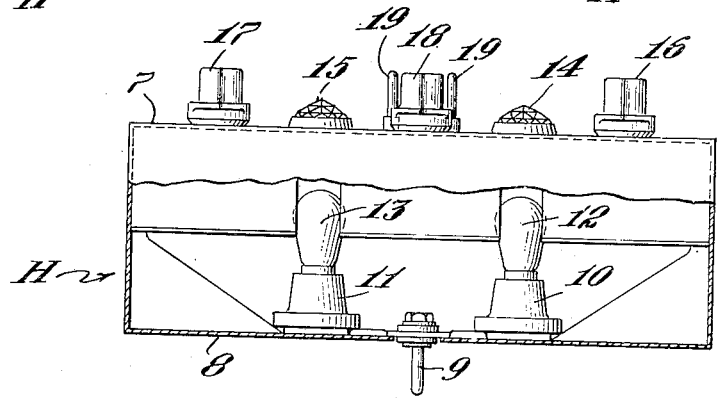
Inventor
Butler Ames
by Roberts Cushman & Grover
Att'ys.

March 1, 1949.　　　　　　　B. AMES　　　　　　　2,463,011
CONTROL UNIT FOR ELECTRIC COOKERS
Filed Feb. 1, 1947　　　　　　　　　　　　　　　　　3 Sheets-Sheet 2

Inventor
Butler Ames
by Roberts Cushman & Cooper
Att'ys.

March 1, 1949.    B. AMES    2,463,011
CONTROL UNIT FOR ELECTRIC COOKERS
Filed Feb. 1, 1947    3 Sheets-Sheet 3

Inventor
Butler Ames
by Roberts Cushman & Grover
att'ys.

Patented Mar. 1, 1949

2,463,011

UNITED STATES PATENT OFFICE 2,463,011

CONTROL UNIT FOR ELECTRIC COOKERS

Butler Ames, Boston, Mass.

Application February 1, 1947, Serial No. 725,785

4 Claims. (Cl. 219—20)

This invention pertains to electrical switches and more particularly to a control device for an electrically energized cooker. In my copending application for Letters Patent, Serial No. 673,267, filed May 3, 1946, I have described a portable electrical cooker, particularly designed for use with the customary 110 volt house lighting current and comprising a top heating unit, and upper and lower oven heating units. Each of these units is capable of regulation to furnish different degrees of heat and the aforesaid application describes current controlling means so designed as to prevent overloading of the circuit. This is accomplished in the arrangement described in said application by the use of two independent switches and corresponding sockets. Thus a single supply conduit can not be plugged in to supply both switches at the same time, and as the connections between the switches and the heating units are such that neither switch can supply current in such a way as to energize all three units simultaneously to maximum capacity, danger of overloading is avoided. While the device of the prior application is thus effective for the purpose it is not so convenient as might be desired, in particular as it requires the user to transfer the supply cord plug from one unit to another in varying the heating effect. Moreover, as illustrated in said application, the sockets and switches are located somewhat inconveniently for the user.

The principal object of the present invention is to provide a control device for a cooker of the class described which is designed to receive current through a single flexible conductor from a house lighting circuit and comprising switches which are so interconnected that it is impossible to supply current to the heating units in such a way as to overload the circuit. A further object is to provide a control device which is compact and of small external dimensions and which may readily be mounted below the oven of a cooker of the above type, where it is conveniently situated for manipulation by the user of the cooker. A further object is to provide a control device having signal means operative to indicate which switch is supplying current at any given time. A further object is to provide a control device comprising a master switch which determines the alternative supply of current to either of two heat regulating or current distributing switches and which in one position completely cuts off current to the apparatus. A further object is to provide a control device which may be used with the 110 volt current customarily employed in this country for lighting purposes, or with 220 volt current such as is commonly used in this country for industrial purposes and in Europe for lighting purposes, and with provision whereby, when used with 220 volt current, both heat regulating switches may be in use at the same time. Other and further objects and advantages of the invention will be pointed out in the following more detailed description and by reference to the accompanying drawings wherein Fig. 1 is a front elevation of a cooker equipped with the control device of the present invention;

Fig. 2 is a fragmentary side elevation of the cooker of Fig. 1;

Fig. 3 is a bottom view with parts broken away, and to larger scale, showing some of the interior construction of the control device;

Figure 4:
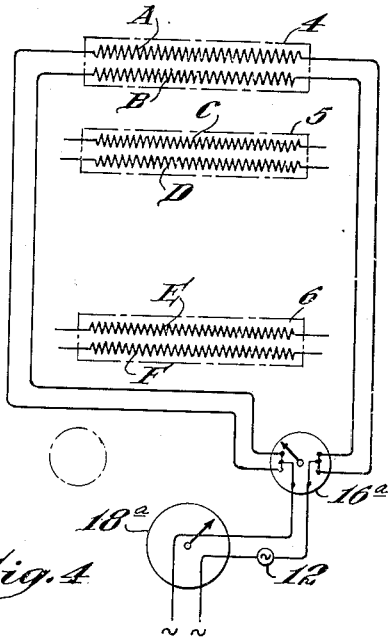
Figs. 4, 5 and 6 are diagrammatic sketches illustrating switch settings and circuits for controlling the top heating unit.

Referring to the drawings, the numeral 1 designates generally an electrically energized cooker of the type above referred to, and with which the control device of the present invention is here associated. This cooker comprises an insulated casing supported in elevated position upon legs 2, set into insulating cups or sleeves, and having the front door 3 which may be swung downwardly to give access to the oven space. A top heating unit 4 is mounted on the top of the casing 1 and upper and lower oven heating units 5 and 6 are arranged within the casing for heating the oven. The unit 5 is so arranged as to supply high intensity radiant energy for cooking in the oven chamber.

As described in the above application, each of the units 4, 5 and 6 comprises two heating coils designed to be energized in different ways so as to provide different degrees of heat. For example the coils of the upper unit 4 may be connected in parallel into the supply circuit, thus providing maximum heating effect. A single one of the coils of the upper unit may be supplied with current to provide medium heat, and two coils may be connected in series to provide low heat. So far as the present invention is concerned the specific structural characteristics and means for supporting the units 4, 5 and 6 are immaterial.

In accordance with the present invention, the control device comprises a housing H of suitable material, for example sheet metal or a plastic, which is preferably so dimensioned that it may be disposed beneath the cooker casing and between the front legs 2 of the cooker, the control device preferably being secured to the bottom or floor of the cooker 1 by suitable attaching means, for example bolts or rivets (not shown). The housing H has a front wall 7 (Fig. 3) which is preferably disposed sufficiently to the rear of the plane of the oven door 3 to provide a space for the forwardly projecting switch handles. The housing H also has a rear wall 8 which supports a terminal receptacle for attachment to a flexible supply conduit or conductor. As here shown, this receptacle has rearwardly directed terminal prongs 9 designed to enter a socket at the end of a flexible supply conduit. The rear wall 8 also supports bases 10 and 11 for incandescent lamps 12 and 13, and the front wall 7 is furnished with openings, aligned with the lamps 12 and 13, which receive faceted red glass lenses or buttons 14 and 15. The lamps with their corresponding lenses constitute indicating means to show when and how the current is being supplied to the heating units.

Figure 10:
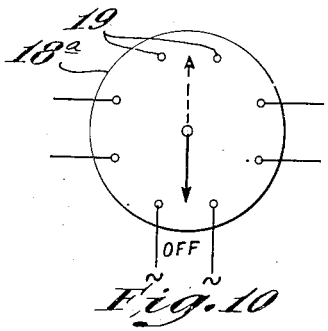
Fig. 10 and 11 are diagrammatic sketches illustrating two possible arrangements of the master switch.
Figure 11:
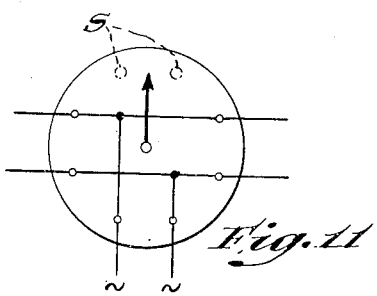

Within the housing H there are arranged two distributing switches 16ª and 17ª, here shown diagrammatically only (in Figs. 4 to 9) having rotatable handles 16 and 17 respectively, which are exposed in front of the wall 7 of the housing H. Between these distributing switches there is arranged a master switch 18ª, (also illustrated only diagrammatically) having the rotatable handle 18 also located forwardly of the wall 7. The distributing and master switches may be of conventional commercial type and the structural details of these switches need not be described herein. Preferably the rotatable handles 16, 17 and 18 are shaped to provide pointer portions to cooperate with markings on the front surface of the wall 7 to indicate the setting of the individual switches. The front wall 7 of the housing H is provided with laterally spaced sockets S (Fig. 11) above the switch handle 18 for the reception of stop pins 19 (Figs. 1, 3 and 10) which are fixed in the sockets when the cooker is intended for use with a house lighting circuit of 110 volts, thereby to prevent the handle 18 from being turned to a position in which its pointer is directed vertically up. However, these pins 19 may be removed when the cooker is intended to be used with current supplied at 220 volts. When the pointer of the master switch handle 18 points downwardly no current is supplied to the cooking apparatus. Fig. 10 diagrammatically suggests this arrangement, showing that there is no connection between the supply mains and any of the conductors leading from the master switch 18ª. Fig. 11 indicates diagrammatically how, when the pointer of the master switch 18ª is directed vertically upward, as permitted by the withdrawal of the pins 19 from sockets S, current from the mains is supplied simultaneously to both circuits leading from the master switch.

Figure 5:
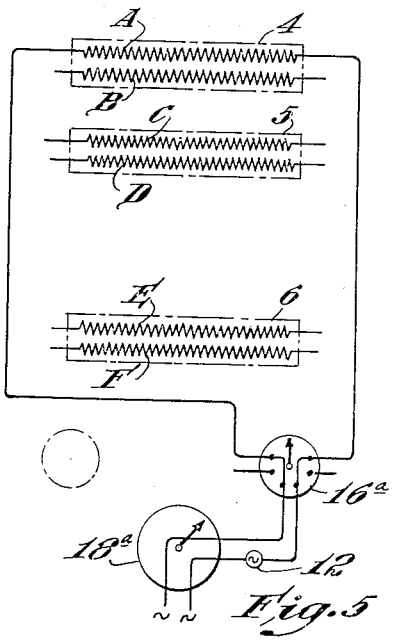
Figure 6:
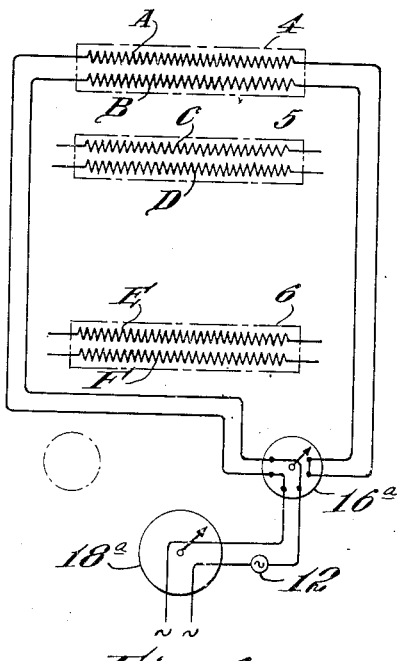

Figs. 4, 5 and 6 diagrammatically indicate the various settings of the switch controlled by the handle 16 for varying the degree of heat at the top unit 4. Thus in Fig. 4, where the master switch 18ª is set to supply current from the mains to the switch 16ª controlled by the handle 16, current is supplied in parallel to the two heating elements A and B of the top heating unit 4 to provide maximum heating effect. The lamp 12 is at the same time energized to show the user that current is being supplied through the distributing switch 16ª. When the handle 16 is turned upwardly, so that its pointer indicates medium heat, the current is supplied to the element A only of the top unit 4 (Fig. 5). When, as shown in Fig. 6, the pointer of the handle 16 is set to indicate low heat, the switch 16ª delivers current to the coils A and B of the top unit 4 in series.

It may be noted that no current is supplied to either of the oven units 5 and 6 while the top unit 4 is being energized, and that at this time no operation of the handle 17 can provide current for the oven units, since the master switch is so set as to provide current for the distributing switch 16ª only, leaving the circuit leading to the switch 17ª open, thus preventing any possible overloading of the supply circuit.

Figure 7:
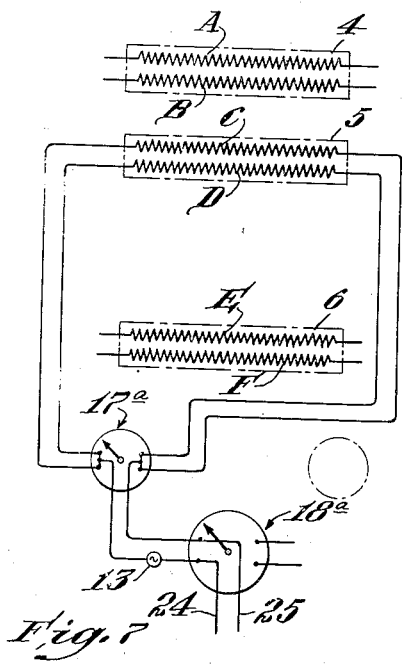
Figs. 7, 8 and 9 are diagrammatic sketches illustrating switch settings and circuits for controlling the upper and lower oven units.
Figure 8:
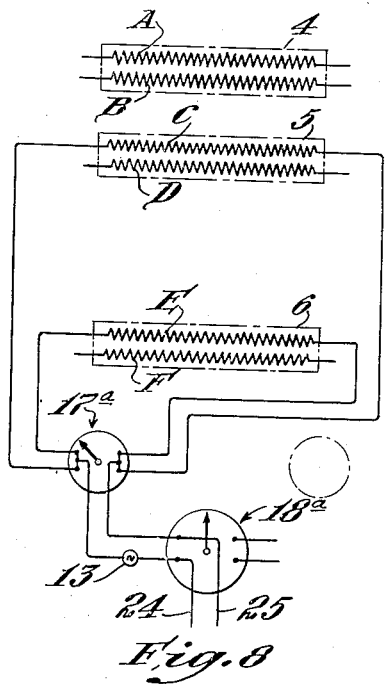
Figure 9:
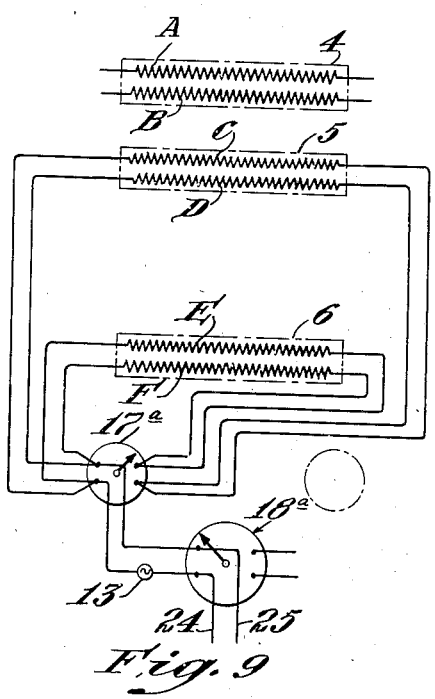

Referring to Figs. 7, 8 and 9, the master switch 18ª is shown diagrammatically as set to supply current to the distributing switch 17ª controlled by handle 17, but with this setting of the master switch no current is supplied to the delivery switch 16ª. With the switch handle 17 turned to indicate high, the corresponding distributing switch 17ª supplies current, as shown in Fig. 7, in parallel, to the heating coils C and D of the upper oven unit 5 to provide maximum heat from these coils. The upper oven unit, as above described, is designed to emit an intense radiant energy into the upper part of the oven, and when the coils C and D are thus energized in parallel, the maximum heating effect is produced within the oven chamber. When the switch handle 17 is turned up, (Fig. 8) so that its pointer indicates medium heat, the switch 17ª establishes a circuit, as shown in Fig. 8, such that the coil C of the upper oven unit 5 and the coil E of the lower oven unit 6 are connected in parallel. The amount of radiant energy emitted from the upper unit 5 is thus substantially reduced but heat energy is also at this time emitted from the lower heating unit 6. When the pointer of the switch handle 17 is turned to low (Fig. 9) the coils C and D of the upper oven unit 5 are connected in series and the coils E and F of the lower oven unit 6 are also connected in series, thus providing the lowest degree of oven heat. Obviously, if a lower degree of oven heat were desirable, all four coils might be connected in series. As already described, only the oven heating units can be energized when the master switch 18ª is set to deliver current to the distributing switch 17ª and with this setting of the master switch no current can be delivered to the distributing switch 16ª so that overloading of the circuit is prevented.

However, if current at 220 volts is available, the pins 19 may be removed from their sockets, thus permitting the handle of the master switch 18ª to be turned to the vertical position shown in Fig. 11. In this position current is supplied to both of the distributing switches 16ª and 17ª at the same time, and thus all three units of the cooker may be energized at once.

While one desirable embodiment of the invention has been illustrated and described by way of example, it is to be understood that the invention is broadly inclusive of any and all modifications falling within the scope of the appended claims.

I claim:

1. A circuit control device for use with an electric cooker comprising heating units whose total energy consumption, if they were all energized at once, would overload a 110 volt supply circuit, said control device comprising a receptacle having terminals for engagement with the terminals of a flexible supply conductor, a pair of current distributing switches and a master switch which receives current from the supply, said master switch including a rotatable actuating handle, the master switch being so designed that when the handle is disposed in either of two selected positions current is delivered to one or the other of the distributing switches alternatively, characterized in that the master switch is also capable of delivering current to both distributing switches simultaneously, and in having stop pins normally projecting into the path of the handle to prevent setting of the handle in a position such that current will be supplied simultaneously to both distributing switches.

2. A circuit control device for use with an electric cooker comprising heating units whose total energy consumption, if they were all energized at once, would overload a 110 volt supply circuit, said control device comprising independent distributing switches for distributing current to certain of said units, and guard means operative, when the cooker is to be used with 110 volt current, to prevent delivery of current to a sufficient number of said units simultaneously to overload the circuit, and a master switch having a rotatable actuating handle, the master switch being so constructed and arranged that when the handle is disposed in either of two selected positions current is delivered to one or the other of the distributing switches respectively, characterized in that the master switch is also inherently capable of delivering current simultaneously to both distributing switches, and in having stop pins normally operative to prevent setting said master switch to deliver current to both distributing switches at once, said stop pins being removable thereby to permit the master switch to be set to deliver current simultaneously to both distributing switches when the cooker is to be used with 220 volt current.

3. Current distributing means for an electrically energized cooker having heating units and a pair of independent distributing switches for controlling the current supply to said units and including a master switch provided with a rotary actuating handle and which is capable of delivering current simultaneously or alternatively to the two distributing switches or to neither, characterized in having means providing a pair of sockets whose axes are perpendicular to the plane of rotation of the switch handle, and a pair of pins designed removably to fit in the respective sockets, the pins being so constructed and arranged that when disposed within the sockets they stand in the path of the switch handle and prevent turning the handle to a position corresponding to that in which current is supplied simultaneously to both distributing switches.

4. In combination in a current distributing system for an electrically energized cooker having heating units served respectively by independent branch circuits, a master switch arranged to receive current from supply mains and having a rotary actuating handle and which is capable, according to various positions of said handle, of supplying current simultaneously or alternatively to the two independent branch circuits or to neither, means providing a socket adjacent to the path of the switch handle, and a removable stop disposable in said socket, said stop comprising a part, which, when the stop is disposed in the socket, stands in the path of the switch handle and thereby prevents turning the handle to the position which it occupies when current is simultaneously supplied to both branch circuits.

BUTLER AMES.

REFERENCES CITED

The following references are of record in the file of this patent:

UNITED STATES PATENTS

| Number | Name | Date |
|---|---|---|
| 1,152,950 | Hoke | Sept. 7, 1915 |
| 1,154,954 | Williams | Sept. 28, 1915 |
| 1,359,889 | Gumaer | Nov. 23, 1920 |
| 1,721,191 | Smith | July 16, 1929 |
| 1,760,257 | Smith | May 27, 1930 |
| 1,901,653 | Kempton | Mar. 14, 1933 |
| 1,954,147 | Shroyer | Apr. 10, 1934 |
| 2,015,624 | Griswold | Sept. 24, 1935 |
| 2,054,544 | Humphreys et al. | Sept. 15, 1936 |
| 2,279,525 | Rogers | Apr. 14, 1942 |
| 2,328,801 | Hammell | Sept. 7, 1943 |
| 2,371,975 | Parsons | Mar. 20, 1945 |
| 2,400,496 | Freeman | May 21, 1946 |

FOREIGN PATENTS

| Number | Country | Date |
|---|---|---|
| 55,146 | Sweden | Aug. 1, 1923 |